(No Model.)
O. M. MARTZ & J. ESSELBURN.
THILL COUPLING.
No. 382,177. Patented May 1, 1888.
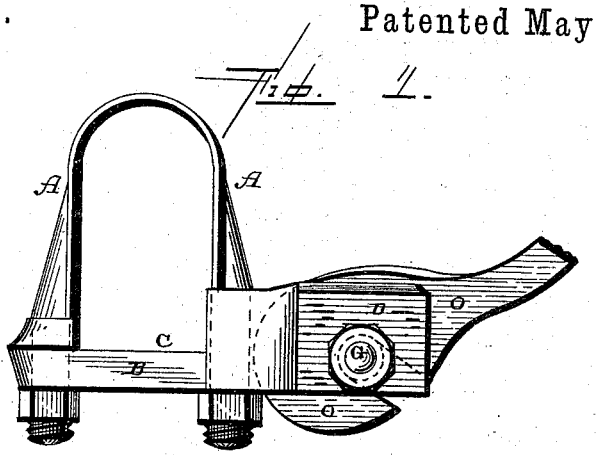
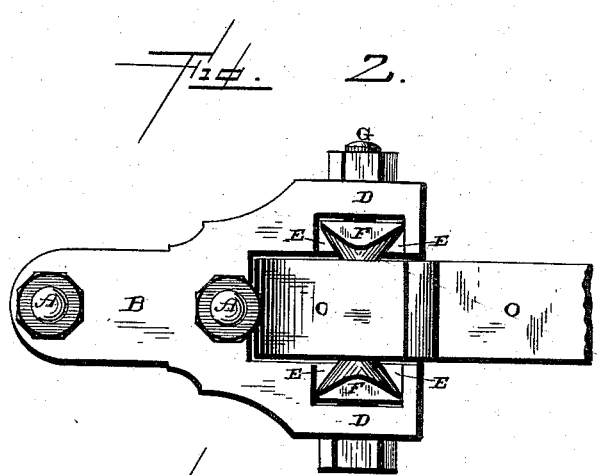
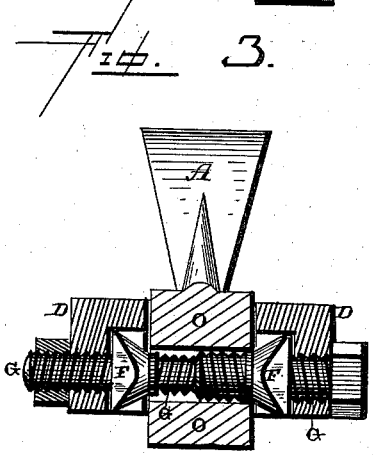
Witnesses.
R. H. Gardner.
Edm. P. Ellis.
Inventors.
O. M. Martz.
Jno. Esselburn,
per F. A. Lehmann,
atty.
N. PETERS, Photo-Lithographer, Washington, D. C.

UNITED STATES PATENT OFFICE.

OLIVER M. MARTZ AND JOHN ESSELBURN, OF WEST SALEM, OHIO.

THILL-COUPLING.

SPECIFICATION forming part of Letters Patent No. 382,177, dated May 1, 1888.

Application filed February 21, 1888. Serial No. 264,820. (No model.)

*To all whom it may concern:*

Be it known that we, OLIVER M. MARTZ and JOHN ESSELBURN, of West Salem, in the county of Wayne and State of Ohio, have invented certain new and useful Improvements in Thill-Couplings; and we do hereby declare the following to be a full, clear, and exact description of the invention, such as will enable others skilled in the art to which it pertains to make and use it, reference being had to the accompanying drawings, which form part of this specification.

Our invention relates to an improvement in thill-couplings; and it consists in the combination of the shackle provided with ears which are suitably recessed upon their under sides, with a right-and-left screw-rod, which passes both through the ears and two nuts, which move back and forth upon the screw in relation to each other, and which are prevented from turning when the screw is revolved by the recesses in the ears, and the shaft-iron, which has a slot through its inner end in which the inner ends of the nuts catch, as will be more fully described hereinafter.

The object of our invention is to provide a thill-coupling in which two tapering nuts are made to move in opposite directions upon the same screw, so as to clamp the shaft-iron rigidly between them and hold it in such a manner that it cannot possibly be accidentally detached, and to dispense with all necessity for packings and springs to prevent rattling.

Figure 1 is a side elevation of a thill-coupling embodying our invention. Fig. 2 is an inverted view of the same. Fig. 3 is a vertical cross-section taken through the screw-bolt.

A represents an ordinary clip, and B the shackle, through which the lower ends of the clip pass in the usual manner. This shackle is provided with a recess, C, in its top, so as to catch over the under edge of the axle, and thus receive the whole draft of the animal, instead of allowing it to come upon the clips, as is usually the case. As the lower ends of the clips simply pass through this shackle and do not have to receive the draft of the animals, should the threads become worn upon its lower ends, or should it become injured in any manner, it can be removed and replaced by another without the slightest injury to the shackle itself.

In the under side of each one of the ears D is made an angular recess, E, to receive the nuts F, which are made conical at their inner ends and which are placed upon the rod G, which passes through both the ears and the nuts, and which has both a right and a left hand thread. These right and left hand threads meet at the center of the rod and serve to cause the two nuts to move back and forth upon the screw-rod in opposite directions. The nuts are made conical and tubular at their inner ends, so as to enter the eye or opening in the shaft-iron from opposite sides, and which nuts are prevented from turning around when the screw-rod is revolved by the recesses in the under side of the ears D. These recesses are made just deep enough to receive the nuts when they are forced outward from each other to their full extent, and catch over opposite edges of the nuts when they are moved inward toward each other, so as to clamp the shaft-iron rigidly between them. These recesses prevent the nuts from having any other than a horizontal motion and in opposite directions upon the screw-rod.

The shaft-iron O is provided with a slot, an eye, or an opening, which extends at a suitable angle, and the mouth of the slot or opening is just sufficiently wide to pass freely over the screw-rod when the nuts are moved outward from each other into the recesses E. After the shaft-iron has been dropped down over the screw-rod, which can only be done when the outer ends of the shafts are depressed, the screw-rod is revolved by means of a wrench which is applied to one end, and then the nuts are forced inward toward each other, so that their conical ends will enter the eye in the shaft-iron and clamp it between them in such a manner that it cannot possibly rattle or make any noise while the vehicle is in motion. As the shaft-iron can only be removed from the screw-rod when the outer ends of the shaft are depressed, it will readily be seen that the shaft cannot become detached even if the screw-rod should allow the nuts to move outward from each other so as to release the shaft-iron from their control. These nuts receive the whole draft or strain and transfer it directly to the shackle, so that no strain can come upon the rod to weaken or endanger it. As the nuts clamp the shaft-iron rigidly between them, no spring or packing of any kind is necessary in order to prevent rattling.

Owing to the shape of the parts, this coupling will not catch and hold mud and dirt which may light upon them, and as the slot in the under side of the shaft-iron opens downward any dirt or dust which may work between the parts will drop out. The screw-rod is provided with a head at one end and a removable nut at the other, and one of its screw-threads is made smaller than the other, so that this threaded portion can pass freely through the nut which fits upon the larger portion of the rod. By applying a wrench to the head of the rod it can be freely revolved and the nuts moved inward, so as to clamp the shaft-iron rigidly between them, or outward from each other, so as to release the shaft-iron and allow it to be freely removed. All of the parts of this coupling remain in position while the changes are being made to allow the shaft-iron to be removed and replaced. The threads of the bolt being made to extend in opposite directions, and the nuts being held in the recesses in the ears D, the rod cannot become displaced even if it should be broken off at both ends.

Having thus described our invention, we claim—

The combination of the clip, the shackle provided with recessed ears, the two nuts placed within the recesses, the screw-rod provided with right and left threads and made to pass through both the ears and the nuts, and the shaft-iron provided with a slot, eye, or opening through its inner end, substantially as shown and described.

In testimony whereof we affix our signatures in presence of two witnesses.

OLIVER M. MARTZ.
JOHN ESSELBURN.

Witnesses:
A. P. NEAL,
L. B. KEELER.